A. R. BURDICK.
Stovepipe Damper.

No. 100,369. Patented March 1, 1870.

United States Patent Office.

A. R. BURDICK, OF RACINE, WISCONSIN.

Letters Patent No. 100,369, dated March 1, 1870.

IMPROVEMENT IN STOVE-PIPE DAMPERS AND VENTILATORS.

The Schedule referred to in these Letters Patent and making part of the same.

*To all whom it may concern:*

Be it known that I, A. R. BURDICK, of Racine, in the county of Racine, and State of Wisconsin, have invented a new and improved Heat-Regulator for Stove-Pipes; and I do hereby declare that the following is a full, clear, and exact description thereof, reference being had to the accompanying drawings making part of this specification, in which—

Similar letters of reference indicate corresponding parts in the three figures.

The object of this invention is to provide for regulating the draught through a pipe leading from a stove to a chimney, and at the same time to ventilate the room by the application of a valve to a hole made through one of the sections of the pipe, when such valve is so constructed and applied that it will, when properly adjusted, contract the smoke passage, and at the same time allow the entrance of air into the pipe both above and below said contracted passage; said valve being also adapted to tightly close the hole through the side of the pipe when a full draught is required, as will be hereinafter explained.

To enable others skilled in the art to understand my invention, I will describe its construction and operation.

In the accompanying drawings—

A represents a section of stove-pipe, having an elliptical or circular opening through one side, the longest diameter of which opening, if elliptical, is in a direction with the length of the pipe.

The transverse or shortest diameter of said opening is equal, or nearly so, to the diameter of the pipe.

B represents a valve, which is made of a shape corresponding to the opening into the pipe, but somewhat larger than this opening, so as to lap over the edges surrounding it, as shown at $b\ b$, when the valve is shut.

Valve B is applied to the pipe by means of pivots $a\ a$, which allow this valve to be adjusted at different angles with respect to the length of the pipe.

Figure 1:
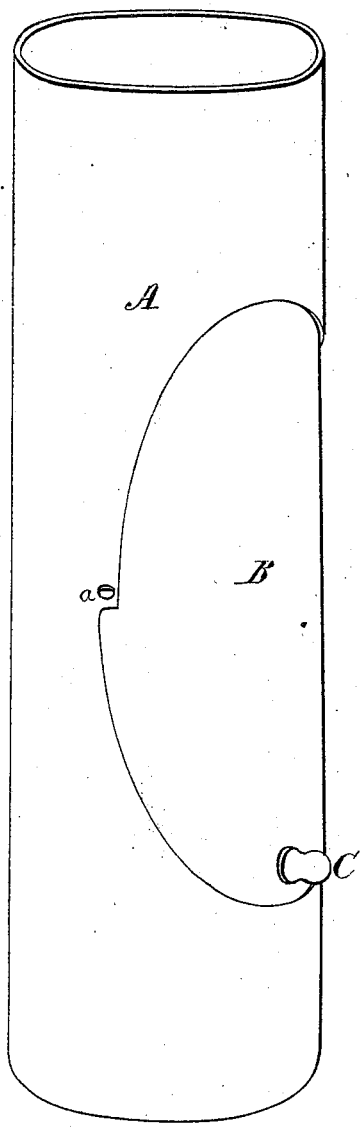
Figure 1 is a perspective view of a stove-pipe section having my improved regulator applied to it.
Figure 2:
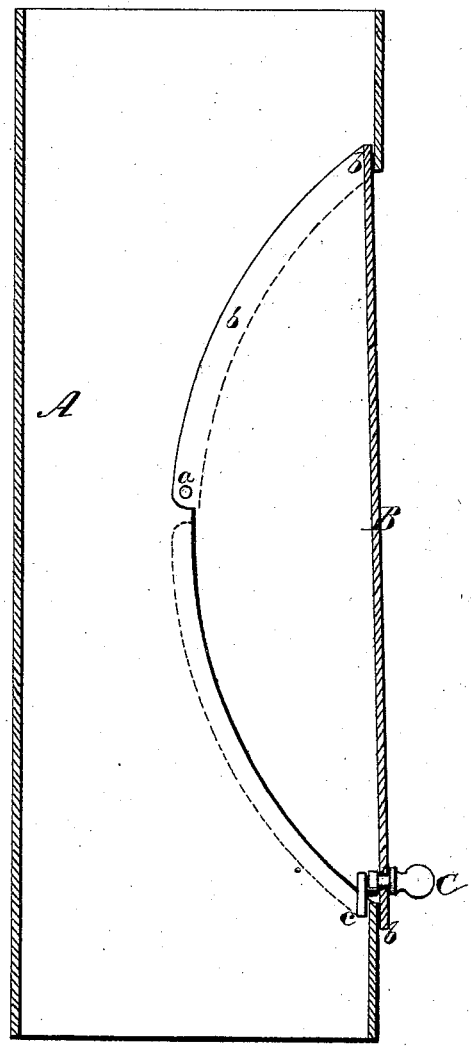
Figure 2 is a diametrical section through the pipe and regulator, indicating by the aid of dotted lines, the regulator in an inclined position.
Figure 3:
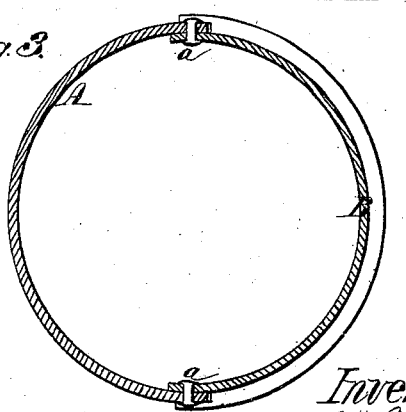
Figure 3 is a section through the pipe and regulator.

The edge of that portion of the valve B which is above the plane of the pivots $a\ a$ is within the pipe, and the edge of the lower half of the valve is outside of the pipe, and the valve is so curved transversely that when shut, as shown in figs. 1 and 2, it will tightly close the opening into the pipe A, and prevent the entrance of air.

C represents the knob of a turn button, $c$, by means of which the valve can be fastened when shut.

The friction about the pivots $a\ a$ and overlapping lips $b\ b$ will be sufficient to keep the valve in place in whatever position it may be adjusted.

It will be seen from the above description that when the valve B is shut and air prevented from entering the pipe, the draught will be at its maximum.

By adjusting the valve at an angle with respect to the length of the pipe, air will be allowed to enter the pipe below the valve as well as above it, which will have the effect of diminishing the draught, and, in proportion as the angle of the valve is increased, in like proportion will the draught be diminished.

It will be seen also that the passage for the products through the pipe is diminished as the obliquity or inclination of the valve is increased.

I am aware that registers and doors have been applied to flues and stove-pipes, but they do not operate to contract the passages through such flues and pipes; nor do they serve to trap the external ascending air currents, and conduct them into the flues, as shown by my invention.

Having described my invention,

What I claim as new, and desire to secure by Letters Patent, is—

The pivoted adjustable valve B, constructed and applied to a stove-pipe, so as to operate as herein described.

A. R. BURDICK. [L. S.]

Witnesses:
JOHN BOWEN,
JOHN W. TROWBRIDGE.